(12) United States Patent
Fourreau

(10) Patent No.: US 8,384,520 B2
(45) Date of Patent: Feb. 26, 2013

(54) GLAZING COMPRISING AN ELECTRONIC DEVICE AND METHOD OF READING/WRITING INFORMATION IN SAID DEVICE

(75) Inventor: Frederic Fourreau, Trainou (FR)

(73) Assignee: Saint-Gobain Glass France, Courbevoie (FR)

(*) Notice: Subject to any disclaimer, the term of this patent is extended or adjusted under 35 U.S.C. 154(b) by 1280 days.

(21) Appl. No.: 11/912,578

(22) PCT Filed: Apr. 24, 2006

(86) PCT No.: PCT/FR2006/050379
§ 371 (c)(1),
(2), (4) Date: Oct. 25, 2007

(87) PCT Pub. No.: WO2006/114543
PCT Pub. Date: Nov. 2, 2006

(65) Prior Publication Data
US 2008/0191841 A1    Aug. 14, 2008

(30) Foreign Application Priority Data

Apr. 26, 2005 (DE) .......................... 10 2005 019 326
Dec. 7, 2005 (FR) ...................................... 05 53755

(51) Int. Cl.
*H04Q 5/22* (2006.01)
*G08B 13/14* (2006.01)
*G05B 19/00* (2006.01)
*G05B 23/02* (2006.01)
*B60R 25/10* (2006.01)
*E04D 13/18* (2006.01)
*E04B 1/00* (2006.01)
*E04C 2/54* (2006.01)
*G06F 7/70* (2006.01)
*G06M 11/02* (2006.01)

(52) U.S. Cl. ...................... 340/10.1; 340/572.1; 340/5.8; 340/426.27; 340/3.43; 340/10.51; 52/173.1; 52/105; 52/786.12; 701/14; 377/12

(58) Field of Classification Search ............... 340/572.1, 340/572.3, 572.4, 572.7, 572.8, 539.1, 10.1, 340/10.4, 10.34, 10.42, 825.69, 825.695; 235/435, 454, 487, 488; 342/124, 357.07, 342/242; 455/456.1, 456.6; 52/173, 786.12, 52/105; 377/12; 701/14
See application file for complete search history.

(56) References Cited

U.S. PATENT DOCUMENTS 5,708,423 A * 1/1998 Ghaffari et al. ................ 340/5.8
6,009,356 A * 12/1999 Monroe ......................... 701/14
(Continued)

FOREIGN PATENT DOCUMENTS

DE          33 38 125        5/1985
DE          196 07 294       8/1997
(Continued)

*Primary Examiner* — Jennifer Mehmood
*Assistant Examiner* — Mirza Alam
(74) *Attorney, Agent, or Firm* — Oblon, Spivak, McClelland, Maier & Neustadt, L.L.P.

(57) ABSTRACT

A window panel including at least one electronic device that includes at least one electronic memory in which is stored information that can be read remotely using an appropriate reading apparatus. An electronic device connected to the memory receives and processes data so as to transmit and enter information to and in the memory in response to signals received in a programmed way by one or more units for detecting and sending data associated with the window panel and/or a device accommodating the window panel.

15 Claims, 1 Drawing Sheet

U.S. PATENT DOCUMENTS

| | | | |
|---|---|---|---|
| 6,275,157 B1 * | 8/2001 | Mays et al. | 340/572.5 |
| 6,662,068 B1 * | 12/2003 | Ghaffari | 700/115 |
| 7,259,730 B2 * | 8/2007 | O'Keeffe | 345/30 |
| 2003/0047538 A1 * | 3/2003 | Trpkovski | 216/84 |
| 2003/0233163 A1 * | 12/2003 | Dorsch | 700/117 |
| 2004/0008114 A1 * | 1/2004 | Sawyer | 340/572.1 |
| 2007/0199255 A1 * | 8/2007 | Paquier | 52/105 |
| 2007/0267150 A1 * | 11/2007 | Schaumberger et al. | 160/7 |

FOREIGN PATENT DOCUMENTS

| | | | |
|---|---|---|---|
| DE | 102005019326 B3 * | 10/2006 | |
| EP | 1 698 455 | 9/2006 | |
| FR | 2 868 988 | 10/2005 | |
| FR | 2868988 A1 * | 10/2005 | |
| WO | 00 36261 | 6/2000 | |
| WO | WO 2005103430 A2 * | 11/2005 | |

* cited by examiner

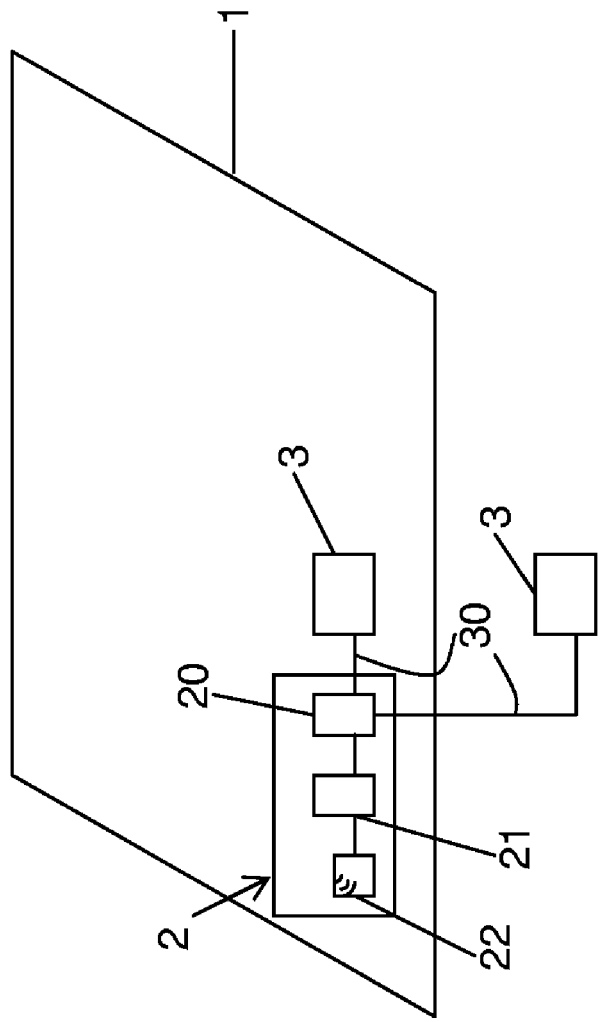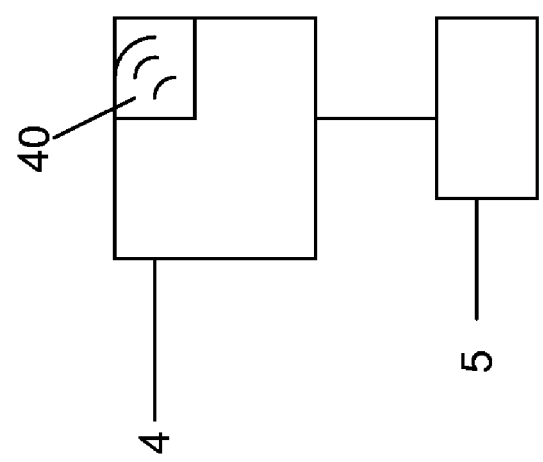

GLAZING COMPRISING AN ELECTRONIC DEVICE AND METHOD OF READING/WRITING INFORMATION IN SAID DEVICE

The invention relates to window panels provided with at least one electronic device which comprises at least one electronic memory containing information that can be read remotely using an appropriate reading apparatus.

The invention will be described more particularly in relation to the field of aeronautics but without being limited to same.

The practice of adding to window panels intended for aeronautical applications such as window panels for airplane cockpits, on leaving the production line, a marking element, normally comprising at least the manufacturer's mark, the serial number and date of manufacture, and a window panel identification code number called "part number", is known. This "part number" registered with an official organization, identifies all the information associated with the technical characteristics of the window panel and its production. Such a marking element is normally printed on a label that is affixed to the glass of the window panel, or even etched onto a metal label that is added to the window panel surround.

Aircraft window panels must be changed periodically because of ageing, which can, for example, result in delamination, deterioration of the heating system, also because of possible breaks, in particular on the ground or on take-off due to flying stone chips or other objects, and finally because of damage to them in flight from bad weather such as frost or lightning, or from collisions with birds.

These window panels are replaced without knowing exactly how many flying hours they have completed. A count of the number of hours between each change of window panels at the present time in fact requires an administrative management that is too complex. This information is therefore not directly available, nor is it even centralized. Only an average number of hours can be established from the date of commissioning of the airplane and the number of flying hours completed by the airplane, and provided that the airline company responsible for the airplane participates, and in a valid way, in communicating this data.

It is, consequently, impossible, in particular for the manufacturer of window panels, to report on the reliability of a window panel in relation to the number of flying hours actually completed. Now, this information could be very usefully exploited to provide for a better tracking of the window panels, optimize changes of the window panels in time, report for the window panel manufacturer on the quality and reliability over time of its window panels with respect to its customers.

Also known is the practice of providing certain window panels, in particular for their tracking from production through to use, of permanent identification means containing information associated with the window panel. These permanent means typically comprise an electronic label associated with the window panel, the electronic label being used to store a large amount of information.

Patent EP 1 114 791 B1 discloses a window panel provided with an electronic label comprising an electronic chip that stores all the information associated with the window panel, and an antenna that handles the transmission of the information between the chip and an external sending/receiving device used to read and/or write the information. The information is exchanged without contact, by electromagnetic wave of a frequency that can vary from 125 kHz to tens of MHz.

Such contactless systems of exchanging data used most commonly for remote identification, anti-theft and object tracking in transit location purposes, are these days known as radiofrequency identification devices (RFID).

In the application that concerns us, in particular that of aeronautical window panels, the electronic labeling of the window panel would be used to read and even write remotely using an apparatus for writing information associated with the technical characteristics of the window panel; this information would thus be directly accessible from the window panel.

The object of the invention is therefore to provide a window panel equipped with an electronic traceability device that provides a way of knowing, throughout the life of the window panel, the technical characteristics associated with the window panel and/or its production, and any information related, over time, to the operation and use of the window panel and/or of the device accommodating the window panel.

According to the invention, the window panel is characterized in that it includes electronic means of receiving and processing data that are connected to the electronic memory of the device, the electronic means transmitting and entering information to and in said memory in response to signals received in a programmed way by one or more units for detecting and sending data associated with the window panel and/or the device accommodating the window panel.

The units for detecting and sending data are understood to be associated with the window panel and/or the device accommodating the window panel in such a way that they do not include the detection units that would detect the presence of the window panel per se.

Furthermore, the expression "in a programmed way" in relation to the signals received, is understood to mean any process of transmitting data that does not involve the decision of a human person to transmit this data.

Thus, the window panel incorporates, according to a programmed record, information that is directly linked to the use of the window panel in its environment and/or linked to the device incorporating the window panel, and/or to an electrical element incorporated in the window panel, this information evolving over time.

Consequently, any information that is useful to the use of the window panel or linked to the environment in which the window panel is used can thus be recorded automatically throughout the life of the window panel without human intervention, and can be made readily accessible because it is incorporated in the window panel.

Preferably, access to the information stored in the memory is reserved for authorized users and handled using encryption/decryption means.

According to another characteristic, the electronic device is protected from the external environment so as not to be damaged, for example, by a change of temperature, by the humidity, vibrations, or any acceleration to which the product in which the window panel incorporated is subject, and also not to be detuned or disturbed for example by undesirable electromagnetic waves, or even so as to operate correctly without being, for example, obstructed by physical obstacles during data transmission. It is also possible to ensure that this device is covered with an appropriate material and/or that it is arranged appropriately.

According to another characteristic, the electronic device is joined to the periphery of the window panel, preferably in a position intended to be concealed by the framework in which the window panel will be housed. The electronic device can also be incorporated inside the window panel provided with at least two sheets of glass, such as a laminated window panel or an insulating window panel. Thus, it is not accessible and will be sheltered from any risk of degradation or accidental removal of the window panel.

The units for detecting and sending data are in particular sensors, such as electrical current sensors, voltage sensors, temperature sensors, pressure sensors, vibration sensors, accelerometers, inclinometers, mechanical actuation detectors, counters, etc.

The unit for detecting and sending data can be included in the window panel or even be remotely sited and associated with the device accommodating the window panel.

Naturally, the interest lies in being able to read at any given time the information stored in the memory of the window panel using an appropriate reading apparatus, this apparatus being able also to operate as a writing apparatus if it is necessary to enter information into the memory, other than by the programmed triggering of units for detecting and sending data, but by a human choice.

Thus, the memory of the electronic device includes information already stored before the operation of the electronic device in response to the signals received in a programmed way, the information being in particular related to the identification, configuration, production characteristics and to the technical characteristics of the window panel, and/or the characteristics relating to the electrical element that the window panel can incorporate.

Throughout the description, the expression "reading/writing apparatus" is used to mean an apparatus for reading or an apparatus for reading and writing. The information is transmitted between the reading/writing apparatus and the electronic device by communication means, the technology of which is chosen in particular according to the location of the electronic device on the window panel in relation to its accommodating environment.

The communication means are thus of the radiofrequency link type, such as radiofrequency identification systems (RFID), Wi-Fi or Bluetooth® technology, or of the type using a link by optical signal such as by infrared, by capacitive or inductive transmission tracks, or quite simply of the cable link type, etc.

These communication means according to the invention preferably involve the transmission of radiofrequency signals, with a frequency that can range from a few hundred kHz to approximately 6 GHz depending on the reading distance. The electronic device preferably uses the RFID technology and, to this end, includes an antenna for identification by radiofrequencies associated with the electronic means, the antenna cooperating with another antenna of the same type associated with the reading/writing apparatus.

Advantageously, the electronic means of the electronic device include an identification system that avoids collision with other information not intended for said device. Thus, the information between the reading/writing apparatus and the electronic device of the window panel is transmitted according to an encoding and encryption protocol that can be a proprietary protocol (developed for this application) or a standard protocol (Modbus, CAN, TCPIP, for example). In the case of a communication set up in the vicinity of several window panels including electronic devices according to the invention, the protocol guarantees the prevention of collisions between information originating from the different memories of the devices.

The reading/writing apparatus in turn stores in memory the results of querying the electronic device. These results can then advantageously be communicated to a central management system, such as a computer, via a cable communication, or any other, such as by Wi-Fi with Internet connection.

To advise of the contactless read and identify the window panel of the invention, it is preferable to provide the window panel with a marking that is clearly recognizable from the outside and which the reading apparatus can approach to obtain a reliable signal transmission. In a particularly discrete way, the marking can take the form of a decoration or the form of a seal or of a manufacturer's logo and can also be laminated as an element of a larger area decoration.

The window panel of the invention is thus intended preferably to be incorporated in a locomotive device, of aeronautical, motor vehicle, rail vehicle type, in such a way, in particular for an aeronautical device, as to store the flying hours in the electronic memory.

The window panel can equally be incorporated in the building. Since the window panels for a building are often insulating window panels, the electronic device of the invention will preferably be incorporated inside the window panel, between the two sheets of glass.

Other characteristics and advantages of the invention will become apparent from the description that follows, in light of the diagrammatic drawing of FIG. 1 which diagrammatically represents a window panel provided with its electronic label according to the invention, and the elements required for the method of storing information and remotely reading the information stored in the electronic label.

The FIGURE is not to scale to facilitate reading.

FIG. 1 illustrates a window panel 1 according to the invention equipped with at least one electronic device 2 which includes electronic means of receiving and processing data 20 and an electronic memory 21.

The electronic device 2 is affixed to an appropriate position on the window panel according to the end use of said window panel, in such a way that the device does not hamper visibility for example. They can, for example, be placed on the glass, or incorporated in the window panel, for example associated with the interlayer in the case of a laminated window panel, or even joined to the peripheral frame surrounding the window panel.

The electronic memory 21 stores information that is entered by the electronic means of receiving and processing data 20 in response to signals received in a programmed way from units for detecting and sending data 3.

In the invention, so-called "dynamic" information (information evolving over time) will be distinguished from "static" information which, once written into the memory 21, can no longer be modified.

The static information is preferably entered by human intervention using a writing apparatus intended to cooperate with the electronic device 2.

The static information typically concerns the manufacturer, the serial number of the window panel, the technical characteristics of the window panel, its method of production, the identification of the product for which the window panel is intended, and so on.

The static information can be acquired during the window panel production phase, in an initialization phase, such as the commissioning of the window panel, or in an updating phase.

The dynamic information entered in memory is bound to be replaced according to data supplied over time and in a programmed way by the detection and sending units 3.

For an example of use of a window panel in an airplane cockpit, the dynamic information will correspond to the flying hours completed with said window panel, the date of commissioning of the window panel, the date it was changed, malfunctions associated with the window panel (elements incorporated in the window panel) or other elements of the device accommodating the window panel, etc. The memory 21 will obviously and usefully be a permanent memory which permanently retains its content even when not voltage powered. It be overwritable, partially, and in a controlled way.

The electronic means of receiving and processing data 20 are connected on the one hand to the electronic memory 21, and on the other hand cooperate with one or more units for detecting and sending data 3 which, when data is taken into account according to their operating mode, trigger in a programmed way the transmission of the signal to the electronic means 20. The electronic means 20 then receiving the data transmitted by the detection and sending units, processes it and transmits the resulting information to the memory 21 according to a predefined writing protocol.

It will be preferable for the detection and sending units 3 to be able to continuously acquire their data and for it to be the electronic means 20 that manage the querying of the units to obtain the data at the required time.

The electronic means of receiving and processing data 20 manage the arrival of the data and its processing using microcontrollers, and other known systems with various functionalities such as A/D converters, clocks, arithmetic and logic units, encryption units, collision prevention units, authentication and access control units, etc.

Physically, the electronic means 20 are made up of a number of electronic components including an electronic memory. However, it is possible to envisage an electronic device 2 forming only a single element such as an electronic label.

According to the type of data to be captured by the detection and sending units 3, the latter can, for example, be directly associated with the window panel or be outside the window panel.

Positioned on the window panel, it can, for example, be a current sensor detecting the current that is induced by a temperature probe connected to the metallic wires or heating layer of the window panel. Since the window panels are always working in heating mode while an airplane is in flight, the use of the current sensor means that the number of flying hours completed can be known based on the operating time of the heating system.

Also worthy of mention are a vibration sensor and a pressure sensor. The pressure sensor, placed, for example, on the window panel, reports on the pressure to which the window panel is subject and, consequently, the time spent for the airplane at altitude, and therefore the flying time.

In the same way, accelerometer and inclinometer type sensors associated with the window panel can be employed. For example, for an airplane, the accelerometer or inclinometer, when a threshold value is exceeded, can be used to trigger on the electronic means 20 a counter for evaluating the number of flying hours of the airplane, this processed number-of-hours data being entered in the memory 21.

However, the detection and sending units 3 can also be outside the window panel.

One example is that of a mechanical or electronic detector associated with a device external to the window panel, the mechanical actuation of which serves as a trigger event for the parameter to be stored in the memory 21 of the electronic device. For an airplane, the external device can correspond to the escape chutes, the arming of which, which will be in place throughout the duration of the flight, will thus report on the flight time.

Other, non-sensor detection and sending units can also be used such as heating regulators or any other information processing system on board the airplane.

Electronic means of receiving and processing data 20 cooperate with the units for detecting and sending data 3 via link elements 30, of the cable type for electrical signals or optical fiber type for optical signals, or even via any known contactless communication means such as link by radiofrequency signals, optical link of the infrared type, etc.

The detection and sending units 3, like the link elements 30 and the electronic device 2, are organized appropriately to be protected from the external environment without risk of damage in order to ensure that the information is stored throughout the life of the window panel.

Furthermore, they exhibit physical and electronic inviolability functionalities to ensure their reliability and therefore the validity of the information entered in the memory 21.

The information entered in the memory 21 is intended to be read by a contactless reading/writing apparatus 4. Of course, the apparatus 4 can also transmit an information signal to the electronic device to write information into the memory 21. Preferably, a contactless link such as a radiofrequency link is chosen as the means of communication between the reading/writing apparatus 4 and the electronic device 2.

Also, the electronic device 2 comprises, connected to the electronic means 20, an antenna 22 operating by electromagnetic waves. The antenna 22 exchanges signals with a corresponding antenna of the same type 40 of the reading/writing apparatus 4.

The reading/writing apparatus 4 is portable, being brought near to the window panel, or can be an integral part of the device, such as the airplane, accommodating the window panel. It is intended to relay the information, by any known means, to a central database system 5, for example a computer, placed inside the airplane or located in any location such as the window panel production factory, the airplane manufacturer, etc.

The method according to the invention of storing information and remotely reading this information is as follows.

On leaving the window panel production facility, the electronic device 2 is joined to the window panel.

The detection and sending units 3 can be connected in the factory if they are directly associated with the window panel, or will be connected when the window panel is mounted in the accommodating recess for which it is intended, if they are positioned remote from the window panel. Physical links 30 can thus, if necessary, exit around the periphery of the window panel for detection and sending units 3 to be subsequently connected.

Static information is, if necessary, already entered in the memory 21.

Once the window panel is delivered, it is mounted in its accommodating recess such as the frame of an airplane cockpit, the necessary connections being set up if necessary between the units 3 and the physical links 30.

According to the parameter or parameters chosen to report on the number of flying hours of the airplane or any other information to be stored in the memory 21 of the electronic device, the sensors or other detection and sending units 3 are triggered when the escape chutes are closed, or when the airplane is taxiing, or on take-off, and so on, and transmit their data according to the query protocol defined by the electronic means 20.

The data received by the electronic means 20 is processed according to a predefined algorithm. A clock internal to the electronic means can, for example, count the time between the take-off and landing of the airplane.

The processed data, such as the elapsed time, is then delivered by the electronic means 20 and entered in the memory 21.

These programmed entry operations based on querying the units for detecting and sending data are linked to parameters relating to the window panel or to the product incorporating the window panel, so they are repeated throughout the life of the window panel.

Naturally, during the life of the window panel, information that is generated by human choice can also be entered into the memory 21 via the electronic means 20 designed to manage the reception of data from sending systems other than the units 3. A reading/writing apparatus 4 will thus cooperate with the electronic device 2.

All the information stored in the memory 21 is then intended to be read using the reading/writing apparatus on board the airplane or brought to its vicinity. This apparatus is designed to retransmit the information read to the central database system 5.

The invention has more particularly been described with regard to an aeronautical application for which the changing information corresponds in particular to flying hours. Nevertheless, the invention can be applied to any window panel for which certain parameters concerning the use of the device accommodating the window panel or the use of the window panel itself cause the programmed storage of information in the memory of the electronic device of the window panel to be triggered. In particular, the invention will be used for any locomotive means incorporating window panels.

However, it is also possible to envisage such window panels in a building such as an apartment block for which, increasingly, electronic detection and/or programming systems are employed, so that all useful information to be stored in memory and remotely queried can thus be stored by the electronic device of the window panel receiving data in a programmed way without human intervention.

The window panel can, for example, include an integrated electrical element, for which it is useful to know operating data or states, the manufacturer or the supplier wishing to know the actual state of use in situ of the incorporated element in order, if necessary, to be able to safeguard against unjustified claims against the warranty.

The integrated element can be an electric motor driving a blind or a fan.

It can also concern an electrically switchable valve for equalizing pressure used to periodically equalize the interior pressure of an insulating window panel and the exterior pressure.

Of general knowledge are load alternating or charge cycle counters which detect the rate of use of electrical and/or mechanical devices by mechanical or electrical/electronic counting and storage and which normally display this rate to allow it to be read by the user and/or service personnel. Take, for example, the copy counter of market-standard photocopiers or the battery charging cycle counter.

Also known are insulating window panels in which solar cells are incorporated.

The operating data or states of the integrated element are thus stored in an automated way in the electronic device 2.

This data can include operating times or triggering times (memory of on times), switching cycles (load alternating counters), maximum temperatures and/or maximum current consumption and/or maximum voltage applied (overwritable memory of maximum values/overload detection) and the like. If the incorporated element comprises photovoltaic solar cells, the current they produce can be entered and evaluated (maximum voltage, capacity supplied, etc.). If necessary, the current produced can, moreover, be used to power the electronic device.

The data can therefore be read remotely. It may, for example, be interesting to read from outside the operating data of electrical elements incorporated in the window panels of a building frontage. The cradle often provided for cleaning the outer surfaces can be used to do it from relatively close but without needing to touch each window panel. According to the range and orientation of the reading apparatus, the reading can even be performed from the ground. There again, it is possible to allow each electronic device and each window panel to be addressed via an individual characteristic and to allow the remote transmission and reading of the operating data only if an appropriate address call signal is received.

Care moreover will have been taken to introduce into the memory 21 of the electronic device static information such as data concerning the serial number or the part number and the date or year of manufacture, so as to enable the element incorporated in the window panel itself and on site to be identified.

The invention claimed is:

1. A window panel comprising:
   one or more sensors for detecting and sending data, the one or more sensors being one of: electrical current sensors, voltage sensors, pressure sensors, temperature sensors, vibration sensors, accelerometers, inclinometers, mechanical actuation detectors, and counters;
   at least one electronic device positioned within the window panel, the at least one electronic device including:
      at least one electronic memory containing information readable remotely using an appropriate reading apparatus; and
      electronic means including a counter, the electronic means connected to the memory for receiving and processing said data to transmit and enter information to and in the memory, said information stored in the memory relating to the window panel or an electrical element incorporated in the window panel,
   wherein
   the information is transmitted to and entered in the memory by the electronic means in response to signals received in a programmed way by the one or more sensors for detecting and sending said data,
   the one or more sensors detect a first trigger event that causes the counter to accumulate a count corresponding to an operation of an apparatus on which the window panel is situated, and
   the one or more sensors detected a second trigger event that causes the counter to stop accumulating the count.

2. The window panel as claimed in claim 1, wherein at least some of the information stored in the memory is linked to parameters that evolve over time.

3. The window panel as claimed in claim 1, wherein access to the information stored in the memory is reserved for authorized users.

4. The window panel as claimed in claim 1, wherein the electronic device is protected from an external environment.

5. The window panel as claimed in claim 1, wherein the electronic device is joined to a periphery of the window panel, directly on a substrate of the window panel, or on an element added to the window panel, or on a peripheral frame, and or in a position configured to be concealed by a framework in which the window panel is housed.

6. The window panel as claimed in claim 1, wherein the electronic device is incorporated inside the window panel provided with at least two sheets of glass.

7. The window panel as claimed in claim 1, wherein the memory of the electronic device includes information already stored before operation of the electronic device in response to the signals received in a programmed way, the information being related to identification, configuration, and production characteristics and to technical characteristics of the window panel or of an electrical element incorporated in the window panel.

8. The window panel as claimed in claim 1, wherein the information stored in the memory of the electronic device of the window panel is configured to be read by a reading/writing apparatus also operating as an apparatus for writing information into the memory in response to a human choice.

9. The window panel as claimed in claim 8, further comprising:
- means of communication between the electronic device and the reading/writing apparatus of a radiofrequency link, or a radiofrequency identification system (RFID), or Wi-Fi or Bluetooth® technology, or using a link by optical signal by infrared, by capacitive, or inductive transmission tracks, or a cable link.

10. The window panel as claimed in claim 9, wherein the means of communication corresponds to radiofrequency signals, the electronic device including an antenna for identification by radiofrequencies associated with the electronic means, the antenna cooperating with another antenna of same type associated with the reading/writing apparatus.

11. The window panel as claimed in claim 1, wherein the electronic means includes a system of identifying the electronic device that avoids collision with other information not intended for the electronic device.

12. The window panel as claimed in claim 1, further comprising:
- a recognition marking providing information on a particular type of the window panel.

13. The window panel as claimed in claim 1, configured to be incorporated in a locomotive device of aeronautical, motor vehicle, or rail vehicle.

14. The window panel as claimed in claim 13, wherein the electronic memory is configured to store flying hours of an aeronautical device.

15. The window panel as claimed in claim 1, configured to be incorporated in a building window panel.

\* \* \* \* \*